May 30, 1967  L. R. HUVAL  3,322,652
MULTI-STAGE SEPARATION APPARATUS AND PROCESS
FOR TREATING HYDROCARBON MIXTURES
Filed March 27, 1963

INVENTOR.
L. R. HUVAL
BY Young & Quigg
ATTORNEYS

United States Patent Office 3,322,652
Patented May 30, 1967

3,322,652
MULTI-STAGE SEPARATION APPARATUS AND PROCESS FOR TREATING HYDROCARBON MIXTURES
Lee R. Huval, Borger, Tex., assignor to Phillips Petroleum Company, a corporation of Delaware
Filed Mar. 27, 1963, Ser. No. 268,332
4 Claims. (Cl. 203—62)

This invention relates to an improved multiple-stage separation process and apparatus therefor.

Conventionally, multiple-stage hydrocarbon separation processes are employed in series wherein it is desired to separate a hydrocarbon fraction from a hydrocarbon feed and subsequently to separate a second hydrocarbon fraction from the first said hydrocarbon fraction. Generally, the first stage of the separation process is operated substantially independently of the second stage. When the separation process involves the transfer of heat in both of the said stages, operating each of the said stages independently substantially increases the cost and reduces the efficiency of the separation process.

Accordingly, an object of my invention is to provide an improved multiple-stage separation process and apparatus therefor.

Another object of my invention is to provide an improved multiple-stage hydrocarbon separation process and apparatus therefor.

Other objects, advantages and features of my invention will be readily apparent to those skilled in the art from the following description, the appended claims and the drawings.

Briefly, the invention comprises a multiple-stage separation process wherein the feed to the first stage is separated into a vaporous fraction and a residual fraction; a part of the vaporous fraction is condensed and a part of the condensed vaporous fraction is recycled to the first stage as reflux; and the remainder of the vaporous fraction and the remainder of the condensed fraction are passed as feed to a second stage wherein the feed to the second stage is separated into at least two fractions.

The invention is applicable to the separation of organic and inorganic fluid mixtures wherein said separation comprises multi-stage fractionation of the said inorganic and organic mixtures.

Figure 1:
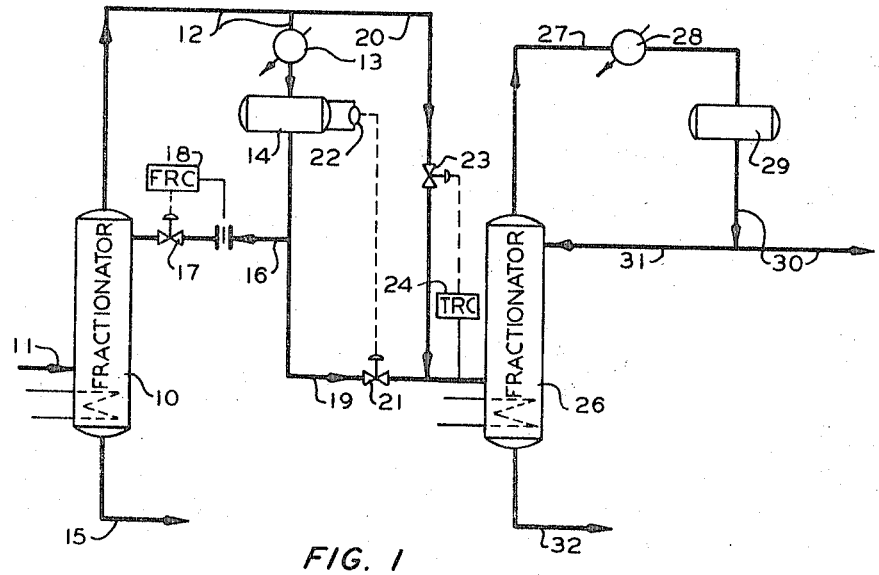
FIGURE 1 is a schematic representation of one embodiment of the invention.

Referring to FIGURE 1, a feed mixture is passed via conduit means 11 to fractionator 10 wherein said feed mixture is separated into a vaporous fraction and a residual fraction by fractional distillation. The residual fraction is withdrawn from fractionator 10 via conduit means 15. The vaporous fraction is withdrawn from the top of fractionator 10 via conduit means 12 and a portion of the vaporous fraction condensed by a heat exchange means 13 and passed to an accumulator 14. The remainder of the vaporous fraction withdrawn from fractionator 10 is passed via conduit means 20, control valve means 23 and conduit means 19 to a fractionator 26.

A portion of the condensed overhead fraction is withdrawn from accumulator 14 via conduit means 19 and recycled via conduit means 16 and control valve means 17 to fractionator 10 as reflux. The remainder of the condensed overhead fraction is withdrawn from accumulator 14 via conduit means 19 and passed through control valve means 21 to fractionator 26 in combination with that portion of the previously described vaporous fraction not passed to heat exchange means 13. The flow of reflux liquid to the top of fractionator 10 is controlled by a conventional flow-recorder-controller 18 manipulating control valve means 17, opening and closing control valve means 17 responsive to a rate of flow measurement in conduit 16 and the set point of controller 18. The flow of the condensed overhead fraction from accumulator 14 to fractionator 26 is controlled by a conventional liquid level controller 22 opening and closing control valve means 21 responsive to the liquid level within accumulator 14 and the set point of liquid level controller 22.

As illustrated, the flow of vaporous fraction through conduit means 20 and 19 to fractionator 26 is controlled by valve means 23. Valve means 23 is opened and closed by a conventional temperature-recorder-controller 24, opening and closing valve 23 responsive to a temperature measurement in conduit means 19 and the set point of controller 24.

Although the vaporous and liquid feeds to fractionator 26 have been combined before introducing the said vaporous and liquid feeds into fractionator 26, it is within the scope of this invention to independently introduce the said feeds into fractionator 26. The preferred method, however, is to combine the feeds for reasons hereinafter discussed.

Within fractiontor 26, the feed is separated by fractional distillation into a vaporous fraction withdrawn from fractionator 26 via conduit means 27 and a residual fraction withdrawn from fractionator 26 via conduit means 32. The vaporous fraction withdrawn from fractionator 26 is condensed by means of a heat exchange means 28 and passed to an accumulator 29. A condensed vaporous product fraction is withdrawn from accumulator 29 via conduit means 30. A portion of the condensed overhead fraction is recycled via conduit means 31 as reflux to the top of fractionator 26.

In operating according to my invention, a substantial reduction in the size of the heat exchange means 13 can be effected over a conventional process wherein all of the overhead vaporous fraction is condensed, with a resulting substantial reduction in operating cost. In addition thereto, the vaporous fraction passing through conduit means 20 at an elevated temperature is employed to preheat the condensed liquid withdrawn from accumulator 14 and passed via conduit means 19 to fractionator 26 as feed. By preheating the feed in the described manner, an additional substantial reduction in fractionation cost has been effected. Normally, when operating according to conventional methods, the feed passed to fractionator 26 would be preheated by a conventional heat exchange means.

Figure 2:
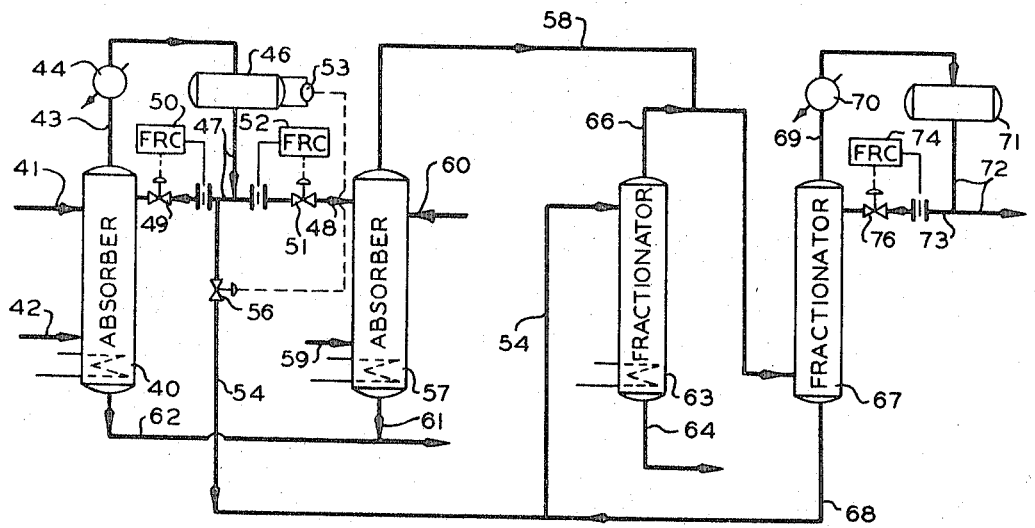
FIGURE 2 is a schematic representation of a second embodiment of the invention.

Referring to FIGURE 2, a second embodiment of the invention is illustrated. The second embodiment will be described as it is applied to a specific separation process although it is not intended that the invention should be limited thereto. A gaseous stream comprising butene-1, butane and heavier hydrocarbons is passed via conduit means 42 and 59 to parallel absorbers 40 and 57, respectively. Lean furfural is passed via conduit means 41 and 60 to absorbers 40 and 57, respectively, at a volume ratio of furfural to hydrocarbon feed of about 10:1. Absorbers 40 and 57 can be operated, for example, at a pressure of 50 p.s.i.g. and at top and bottom temperatures of 90° and 300° F., respectively.

Unabsorbed vapors comprising butane and heavier hydrocarbons are withdrawn from absorber 40 via conduit means 43, condensed via heat exchange means 44 and passed to an accumulator 46. A portion of the condensed liquid in accumulator 46 is passed via conduit means 47 and valve means 49 to the top of the absorber 40 as reflux. Another portion of the condensed liquid is passed from accumulator 46 via conduit means 47, valve means 51 and conduit means 48 to the top of absorber 57 as reflux. Condensed liquid is withdrawn from accumulator 46 via conduit means 47 and passed via conduit means 54 to fractionator 63.

The flow of condensed liquid from conduit means 54 to fractionator 63 is controlled by a conventional liquid level controller 53 opening and closing valve means 56 responsive to the liquid level within accumulator 46 and the set point of controller 53. The flow of reflux liquid to the top of absorber 40 is controlled by a conventional flow-recorder-controller 50 opening and closing valve means 49 responsive to a rate of flow measurement in conduit 47 downstream of the intersection of conduits 54 and 47 and the set point of flow-recorder-controller 50. The flow of reflux liquid to the top of absorber 57 is controlled by a conventional flow-recorder-controller 52 opening and closing valve means 51 responsive to a rate of flow measurement in conduit means 48 and the set point of flow-recorder-controller 52. The rate of flow of reflux liquid to absorbers 40 and 57 can be equal to the rate of flow of hydrocarbon feed to the absorbers.

Unabsorbed vapors are withdrawn from absorber 57 via conduit means 58 and passed via conduit means 66 to fractionator 67. Rich furfural containing butene-1 is withdrawn from absorber 40 via conduit means 62. Rich furfural is withdrawn from absorber 57 via conduit means 61 and combined with the rich furfural withdrawn from absorber 40 in conduit 62. The combined rich furfural is passed via conduit means 62 to further processing not herein illustrated.

It is within the scope of this invention to employ a single absorption zone. Operating with a single absorption zone, only a portion of the unabsorbed vapors withdrawn from the absorption zone would be condensed. A portion of the condensed vapors would be returned to the absorption zone as reflux. The remainder of the condensed vapors and the remainder of the unabsorbed vapors can be passed as previously described to fractionators 63 and 67, respectively.

A feed stream comprising butane and heavier hydrocarbons is passed via conduit means 54 in the heretofore described manner to fractionator 63. Within fractionator 63, the feed stream is separated by fractional distillation into a vaporous fraction withdrawn from fractionator 63 via conduit means 66 and a residual fraction comprising hydrocarbons heavier than butane withdrawn from fractionator 63 via conduit means 64. The vaporous stream withdrawn from fractionator 63 via conduit means 66 is combined with the unabsorbed vapors withdrawn from absorber 57, and the combined vaporous stream passed to fractionator 67. As illustrated, fractionators 63 and 67 are separate vessels. It is within the scope of this invention to employ a single fractionator in place of fractionators 63 and 67. Operating with one fractionator, the vaporous stream withdrawn from absorber 57 via conduit means 58 can be combined with the condensed stream in conduit 54 and the combined stream passed to the single fractionator as illustrated in FIGURE 1. Fractionator 63 can be operated at a bottom temperature of, for example, 350° F. and fractionator 67 operated at a top temperature and pressure of 130° F. and 75 p.s.i.g., respectively.

A vaporous stream comprising butane is withdrawn from the upper region of fractionator 67 via conduit means 69, condensed via heat exchange means 70, and passed to an accumulator 71. A portion of the butane in accumulator 71 is recycled via conduit means 72, conduit means 73 and valve means 76 to the top of fractionator 67. The remainder of the butane is withdrawn as product from accumulator 71 via conduit means 72. The rate of flow of reflux to the top of fractionator 67 is controlled by a conventional flow-recorder-controller 74, said controller opening and closing valve means 76 responsive to a rate of flow measurement in conduit means 73 and the set point of controller 74.

A liquid stream is withdrawn from the bottom of fractionator 67 via conduit means 68 and combined with the liquid feed to fractionator 63 in conduit 54. The combined liquid stream is passed to fractionator 63 in the heretofore described manner. A hydrocarbon stream comprising hydrocarbons heavier than butane is withdrawn from the bottom of fractionator 63 via conduit means 64.

With reference to the embodiments illustrated in FIGURE 1, the ratio of the overhead vapors from fractionator 10 that are condensed to the vapors that bypass condensing means 13 will vary with each specific separation process. Referring to FIGURE 2, it is within the scope of this invention to condense a portion of the overhead vapors withdrawn from absorber 57 if additional absorber reflux is required, passing the uncondensed vapors in the heretofore described manner to fractionator 67.

As will be evident to those skilled in the art, various modifications of this invention can be made, or followed, in view of the foregoing disclosure and the appended claims.

I claim:

1. A process for separating close boiling hydrocarbon fractions which comprises passing a fluid hydrocarbon mixture to a first and second absorption zones, passing a solvent to each of said first and second absorption zones, said solvent selective to a constituent of said fluid hydrocarbon mixture, withdrawing a vapor from said first absorption zone, withdrawing a vapor from said second absorption zone, withdrawing solvent containing said constituent from each of said first and second absorption zones, condensing said vapor withdrawn from said first absorption zone, passing a portion of said condensed vapor to each of said first and second absorption zones as reflux, passing the remainder of said condensed vapor to a fractional distillation zone, passing said vapor withdrawn from said second absorption zone to said fractional distillation zone, withdrawing a first fraction from said fractional distillation zone, and withdrawing a second fraction from said fractional distillation zone.

2. A process for separating close boiling hydrocarbon fractions which comprises passing a fluid hydrocarbon mixture to a first and second absorption zones, passing a solvent to each of said first and second absorption zones, said solvent selective to a constituent of said fluid hydrocarbon mixture, withdrawing a vapor from said first absorption zone, withdrawing a vapor from said second absorption zone, withdrawing solvent containing said constituent from each of said first and second absorption zones, condensing said vapor withdrawn from said first absorption zone, passing a portion of said condensed vapor to each of said first and second absorption zones as reflux, passing the remainder of said condensed vapor to a first fractional distillation zone, passing a vapor from said first fractional distillation zone to a second fractional distillation zone, passing said vapor withdrawn from said second absorption zone to said second fractional distillation zone, condensing a vapor withdrawn from said second fractional distillation zone, recycling a portion of said second fractional distillation zone condensed vapor to said second fractional distillation zone as reflux, passing a liquid from said second fractional distillation zone to said first fractional distillation zone, and withdrawing a liquid from said first fractional distillation zone.

3. The process of claim 2 wherein said fluid hydrocarbon mixture comprises butene-1, butane and heavier hydrocarbons, said solvent comprises furfural, said constituent comprises butene-1, said second fractional distillation zone condensed vapor comprises butane, and said liquid withdrawn from said first fractional distillation zone comprises said heavier hydrocarbons.

4. A multi-stage separation apparatus for treating hydrocarbon mixtures to separate close boiling hydrocarbon fractions comprising a first absorber column, a second absorber column, first conduit means in communication with the lower region of said first column to introduce a hydrocarbon mixture thereto, second conduit means in communication with the upper region of said first column to introduce a selective solvent thereto, third conduit means in communication with the bottom of said first column to remove liquid solvent and a dissolved component of said hydrocarbon mixture, fourth conduit means in communication with the lower region of said second column to introduce a hydrocarbon mixture thereto, fifth conduit means in communication with the upper region of said second column to introduce a selective solvent thereto, sixth conduit means in communication with the bottom of said second column to remove solvent plus a dissolved component of said hydrocarbon mixture, a storage vessel, seventh conduit means including a condenser communicating between the top of said first column and said storage vessel to pass overhead vapor from said first column through said condenser to condense the vapor and pass the resulting condensate to said storage vessel, eighth conduit means communicating between said storage vessel and the upper region of said first column to supply reflux thereto, ninth conduit means communicating between said storage vessel and the upper region of said second column to supply reflux liquid thereto, a first fractional distillation column, tenth conduit means communicating between said storage vessel and the upper region of said first fractional distillation column to pass liquid to said third column, a second fractional distillation column, eleventh conduit means communicating between the top of said first fractional distillation column and the lower region of said second fractional distillation column to pass overhead vapors from said first fractional distillation column to said second fractional distillation column, twelfth conduit means communicating with the lower region of said first fractional distillation column to remove liquid therefrom, thirteenth conduit means communicating between the top of said second absorber column and the lower region of said second fractional distillation column to supply vapors thereto, fourteenth conduit means communicating with the upper region of said second fractional distillation column to remove vapors therefrom, and fifteenth conduit means communicating between the bottom of said second fractional distillation column and the upper region of said first fractional distillation column to supply liquid thereto.

References Cited

UNITED STATES PATENTS

| | | | |
|---|---|---|---|
| 2,325,379 | 7/1943 | Durrum | 203—57 |
| 2,339,160 | 1/1944 | Dunn et al. | 203—52 X |
| 2,398,689 | 4/1946 | Bloomer | 203—75 |
| 2,415,192 | 2/1947 | Rittenhouse | 203—42 |
| 2,415,921 | 2/1947 | Wagner | 203—54 |
| 2,514,294 | 7/1950 | Rupp | 203—75 X |
| 2,555,939 | 6/1951 | Sherwin | 203—75 |
| 2,661,812 | 12/1953 | Gilmore | 203—75 |
| 2,750,435 | 1/1956 | Fetchin | 203—58 X |
| 2,868,701 | 1/1959 | Berger | 202—160 X |
| 3,228,860 | 1/1966 | Larson | 203—2 |
| 3,232,850 | 2/1966 | Renberg et al. | 203—58 |

NORMAN YUDKOFF, *Primary Examiner.*

F. E. DRUMMOND, *Assistant Examiner.*